US005172470A

United States Patent [19]

Ichikawa et al.

[11] Patent Number: 5,172,470

[45] Date of Patent: Dec. 22, 1992

[54] METHOD OF AND APPARATUS FOR SHAPING FILM CARTRIDGE

[75] Inventors: Haruo Ichikawa; Sanpei Iida; Koichi Takahashi, all of Kanagawa, Japan

[73] Assignee: Fuji Photo Film Co., Ltd., Kanagawa, Japan

[21] Appl. No.: 651,000

[22] Filed: Feb. 4, 1991

Related U.S. Application Data

[60] Continuation of Ser. No. 456,205, Dec. 20, 1989, abandoned, which is a continuation of Ser. No. 278,864, Dec. 2, 1988, abandoned, which is a division of Ser. No. 154,255, Feb. 10, 1988, abandoned.

[30] Foreign Application Priority Data

Feb. 1, 1987 [JP] Japan ................................ 62-29235

[51] Int. Cl.[5] ............................................ B23P 19/00

[52] U.S. Cl. ...................................... 29/806; 29/773; 29/788; 413/69

[58] Field of Search ........... 29/429, 430, 431, DIG. 3, 29/DIG. 32, 806, 516, 517, 512, 515, 773, 788, 796, 801, 33 D, 33 T; 72/51, 368; 413/2, 69; 493/105

[56] References Cited

U.S. PATENT DOCUMENTS

| | | |
|---|---|---|
| 2,026,780 | 1/1936 | Frostad . |
| 2,339,807 | 1/1944 | Rau ................................. 29/773 X |
| 2,725,001 | 11/1955 | O'Neil ................................ 493/105 |
| 2,925,059 | 2/1960 | Smith et al. ...................... 29/773 X |
| 3,053,209 | 9/1962 | Smith et al. . |
| 3,157,339 | 11/1964 | Negoro . |
| 3,416,412 | 12/1968 | Wilcox . |
| 4,513,596 | 4/1985 | Usher ..................................... 72/51 |

FOREIGN PATENT DOCUMENTS

| | | |
|---|---|---|
| 58-21248 | 2/1983 | Japan . |
| 59-143841 | 2/1983 | Japan . |
| 00320 | 9/1984 | PCT Int'l Appl. . |
| 487812 | 6/1938 | United Kingdom . |
| 820049 | 9/1959 | United Kingdom . |

*Primary Examiner*—Joseph M. Gorski
*Attorney, Agent, or Firm*—Sughrue, Mion, Zinn, Macpeak & Seas

[57] ABSTRACT

When shaping a film cartridge having a hollow cylindrical shell and caps mounted on ends of the shell, a shell plate is brought into abutment with a mandrel having a perfectly circular cross section and bent around the mandrel by a bending roller. A cap is mounted on an end of the hollow cylindrical shell while it is on the mandrel, and the cap is clinched to the hollow shell while the cap and the hollow shell are grasped from the outside.

1 Claim, 4 Drawing Sheets

METHOD OF AND APPARATUS FOR SHAPING FILM CARTRIDGE

This is a continuation of application Ser. No. 07/456,205, filed Dec. 20, 1989, now abandoned, which is a continuation of application Ser. No. 07/278,864 filed Dec. 2, 1988, now abandoned, which is a divisional of application Ser. No. 07/154,255, filed Feb. 10, 1988, now abandoned.

BACKGROUND OF THE INVENTION

1. Field of the Invention

This invention relates to a method of and an apparatus for shaping a film cartridge for accommodating therein a roll film, and more particularly to a method of bending a shell plate into a hollow cylinder, capping the hollow cylinder and clinching the assembly thus obtained, and to an apparatus for carrying out the method.

2. Description of the Prior Art

There have been put into practice various methods of and apparatuses for bending a shell plate into a hollow cylinder, mounting caps on the upper and lower ends of the hollow cylinder (capping), and clinching the assembly thus obtained in shaping of a film cartridge. For example, in Japanese Unexamined Patent Publication No. 59(1984)-143841, there is disclosed an improvement on such an apparatus and a method.

Conventionally, there has been encountered a problem in shaping of the film cartridge that when a mandrel having a perfectly circular cross section is used for bending the shell plate, the cross section of the obtained shell does not become perfectly circular due to the spring back effect of the shell plate. Accordingly, a mandrel having an ellipsoidal cross section has been generally used. However, the ellipsoidal mandrel is disadvantageous in that since the cap, which is perfectly circular in shape, cannot be mounted on the shell plate as the shell plate is bent around the ellipsoidal mandrel, the shaped shell plate must be removed from the mandrel and the removed shell plate having an Ω-shaped cross section must be conveyed to and positioned at the capping station. Due to its cross-sectional shape, the Ω-shaped shell plate is difficult to convey and position. Further, the Ω-shaped shell plates are apt to fluctuate in size and shape, and accordingly, it is very difficult to cap the Ω-shaped shell plates with high accuracy. Further, since capping and clinching must be effected at a station different from the station at which the shell plate is bent, the apparatus is enlarged in size and complicated in structure.

SUMMARY OF THE INVENTION

In view of the foregoing observations and description, the primary object of the present invention is to provide a method of and apparatus for shaping a film cartridge in which a film cartridge having a perfectly circular cross section can be obtained by use of a mandrel having a perfectly circular cross section when bending a shell plate.

Another object of the present invention is to provide a method of and an apparatus for shaping a film cartridge in which bending of the shell plate, capping and clinching can be accomplished at a single station.

In one aspect of the present invention, there is provided a method of shaping a film cartridge having a hollow cylindrical shell and caps mounted on ends of the shell, comprising the steps of bringing a shell plate into abutment with a mandrel having a perfectly circular cross section, bending the shell plate around the mandrel by a bending roller, mounting a cap on an end of the shaped shell plate while it is on the mandrel, and clinching the cap to the shell plate while the cap and the hollow shell are grasped from the outside.

In another aspect of the present invention, there is provided an apparatus for shaping a film cartridge having a hollow cylindrical shell and caps mounted on ends of the shell, comprising a mandrel having a perfectly circular cross section, an auxiliary fitment for pressing a shell plate against the mandrel, a shaping device which has a bending roller and is movable toward the mandrel to shape the shell plate around the mandrel, and a capping-and-clinching device which is movable toward the mandrel to mount the cap on the cylindrical shell plate on the mandrel and clinches the cap to the shell plate while grasping the hollow cylindrical shell and the cap from the outside.

In accordance with the present invention, the shell plate is bent around the mandrel into a hollow cylinder having a perfectly circular cross section, and the cap is clinched to the shell plate while it is on the mandrel. That is, shaping of the shell plate, capping and clinching are accomplished at one station.

DESCRIPTION OF THE PREFERRED EMBODIMENT

Figure 1:
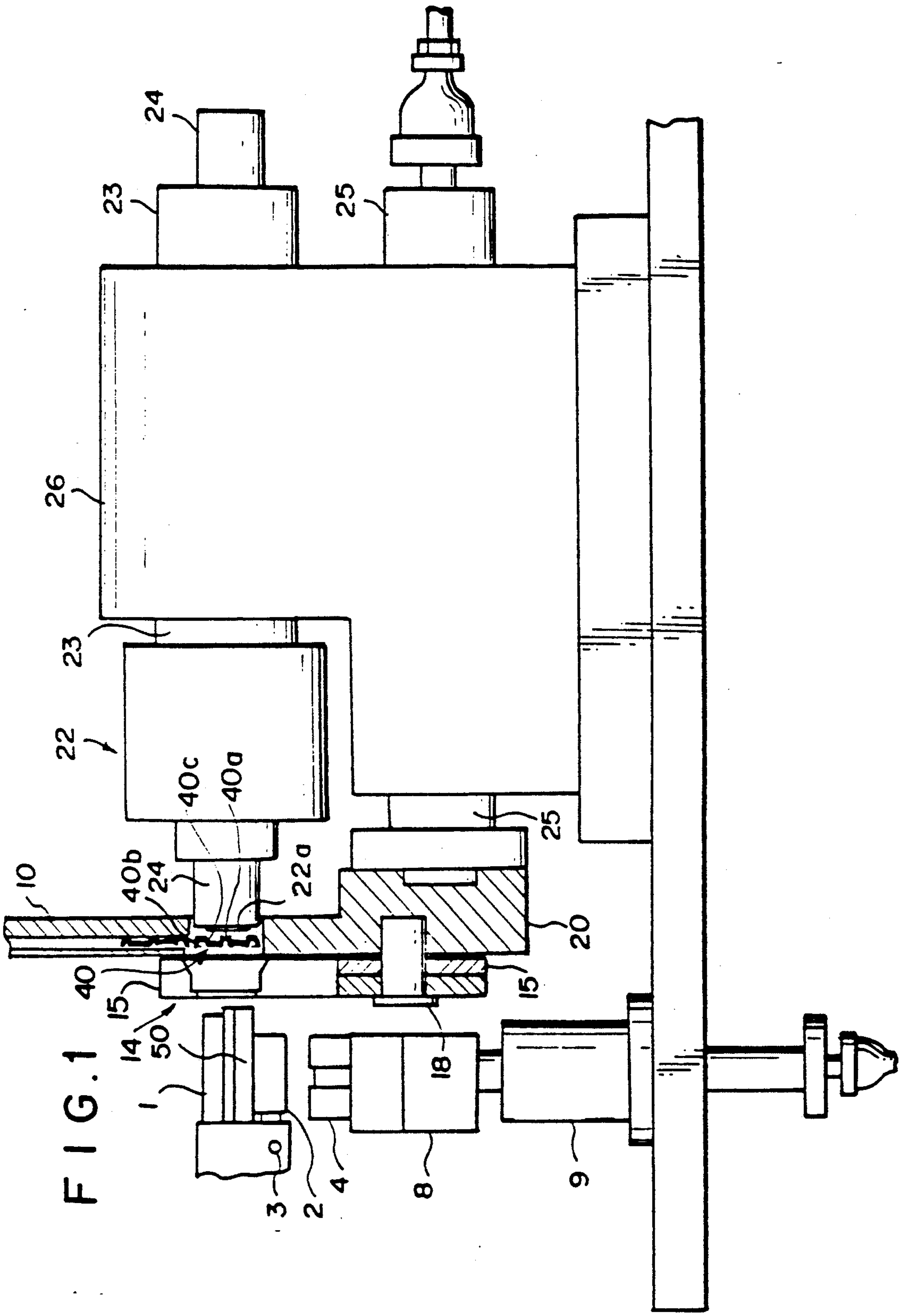
FIG. 1 is a front view of a film cartridge shaping apparatus in accordance with an embodiment of the present invention.
Figure 2:
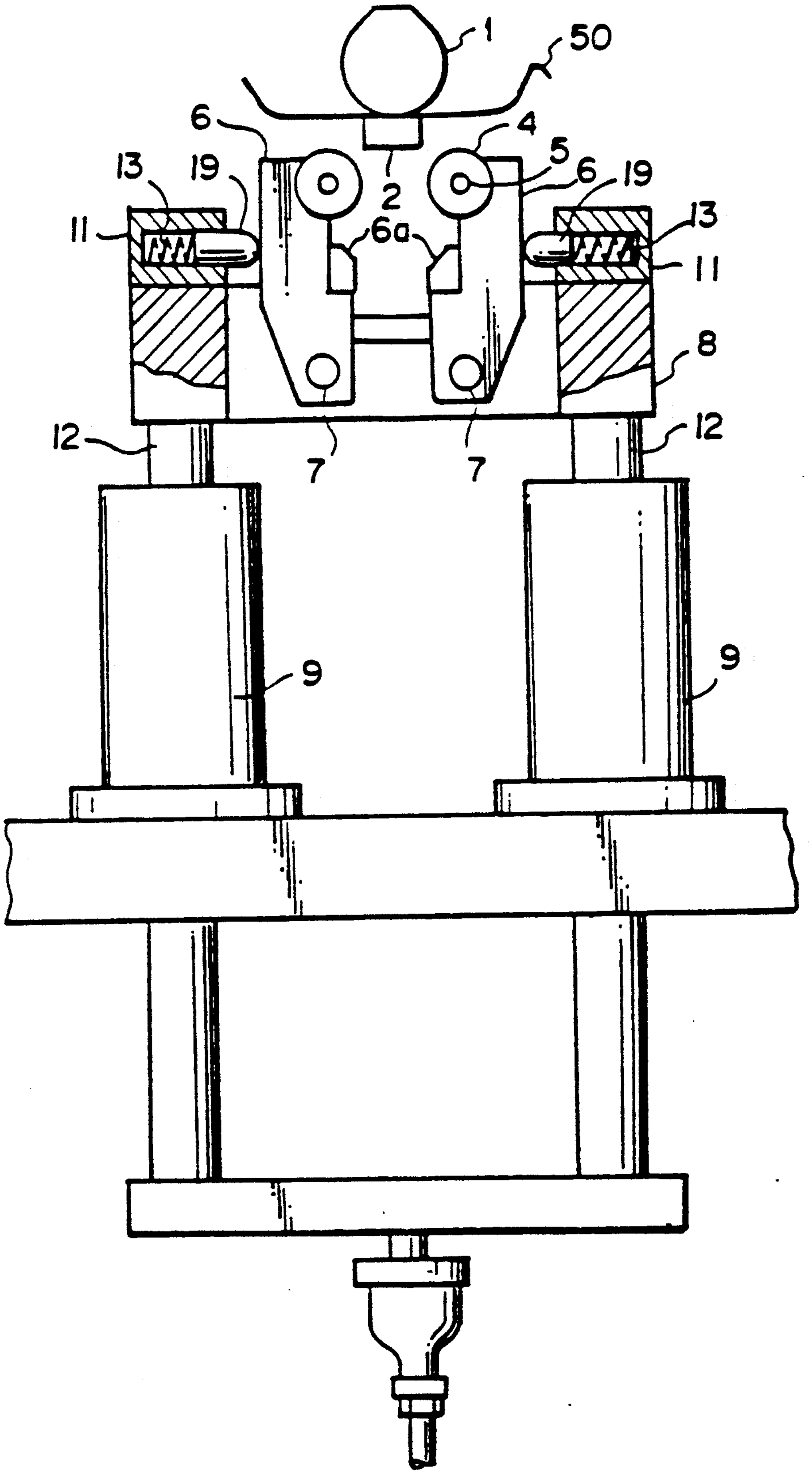
FIG. 2 is a side view showing the shaping device employed in the apparatus.

In FIGS. 1 and 2, a mandrel 1 which is perfectly circular in cross section and an auxiliary fitment 2 are conveyed left and right as seen in FIG. 1 by a driving device (not shown). The auxiliary fitment 2 is swung by a lever (not shown) about a pin 3 away from and toward the mandrel 1 to pinch a shell plate 50 therebetween. The mandrel 1 together with the auxiliary fitment 2 will be referred to as the "mandrel assembly", hereinbelow.

A shaping device is provided below the mandrel assembly. The shaping device includes a pair of arms 6 mounted on a roller holder 8 for pivotal motion about pivots 7 fixed to the roller holder 8. A bending roller 4 is mounted on the upper end portion of each of the arms 6 for rotation about a shaft 5, and an auxiliary fitment *6a* is mounted on an intermediate portion of each of the arms 6. The arms 6 are arranged so that the bending rollers 4 are opposed to each other, and each arm 6 is supported by a roller pusher assembly 11 disposed on the outer side of the arm 6 opposite to the roller 4. The roller pusher assembly 11 includes a roller pusher 19 which is slidably received in a hole and is urged by a compression spring 13 to project from the hole and to abut against the outer side of the arm 6. The shaping device having the structure described above is integrally moved up and down by cams (not shown) which are provided in housings 9 and are associated with shafts 12 fixed to the lower surface of the roller holder 8. FIG. 2 shows a condition in which the shaping device is in the lower position, and FIG. 5 shows a condition in which the shaping device is in the upper position in which the shell plate 50 is shaped up by the bending rollers 4 and pressed against the peripheral surface of the mandrel 1. Since the shaping device moves solely in a vertical direction by means of shaft 12 in FIGS. 2 and 4, as described above, the mandrel 1 must remain stationary relative to the moving bending roller during the shaping of the shell plate.

Figure 3:
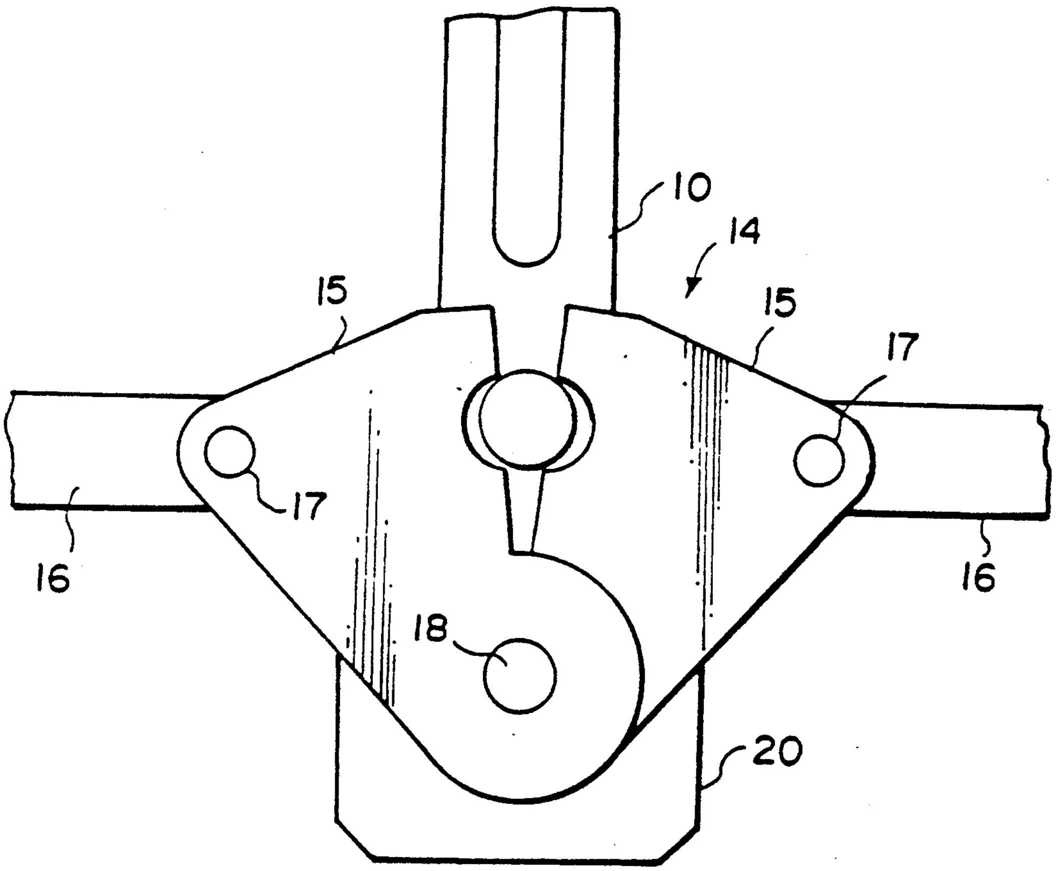
FIG. 3 is an enlarged fragmentary view showing a part of the capping-and-clinching device employed in the apparatus.

A capping-and-clinching device are provided on one side of the mandrel assembly and the shaping device so as to be movable in parallel to the longitudinal axis of the mandrel 1. The capping-and-clinching device includes a chuck 14 (FIG. 3) comprising a pair of chuck halves 15 supported for rotation about a common pivot 18 fixed to a chuck holder 20. A pair of drive rods 16 are rotatably connected to the respective chuck halves 15 by way of pivots 17. The drive rods 16 are driven by a cam (not shown) to open and close the chuck 14 to grip a portion of the cylindrical shell plate 50 to be capped. A cap chute 10 for supplying caps 40 is provided above the chuck holder 20. The cap 40 has a central opening 40*a* through which a film spool projects outside, and an annular groove 40*b* extending along the peripheral edge of the cap 40 and opening on one side of the cap 40. On the other side of the cap 40 is formed an annular recess surrounded by an annular wall 40*c* which defines the inner peripheral wall of said annular groove 40*b*. The chuck holder 20 is moved back and forth in parallel to the longitudinal axis of the mandrel 1 by a shaft 25 slidably supported on a holder 26. A clinching head 22 is moved back and forth in parallel to the longitudinal axis of the mandrel 1 by a shaft 23 which is slidably supported on the holder 26. The clinching head 22 brings the cap 40 into engagement with an end of the cylindrical shell plate 50 so that the end of the shell plate 50 is received in the annular groove 40*b* of the cap 40. The clinching head 22 has expansion claws 22*a* which can be expanded by a shaft 24 slidably supported in the shaft 23 and a cam (not shown) associated with the shaft 23 to radially outwardly press the annular wall 40*c* of the cap 40. Since the clinching head 22 moves solely in a direction parallel to the longitudinal axis of the mandrel 1 by means of shaft 23 in FIGS. 1 and 6, as described above, the mandrel 1 must remain stationary relative to the moving capping-and-clinching device during the capping of the shell plate.

Now the operation of this apparatus will be described.

First the auxiliary fitment 2 is swung away from the mandrel 1 and a shell plate 50 for forming the shell portion of the film cartridge is inserted between the auxiliary fitment 2 and the mandrel 1. Thereafter the auxiliary fitment 2 is swung toward the mandrel 1 to pinch therebetween the shell plate 50. In this state, the mandrel 1 is moved to the position shown in FIGS. 1 and 2.

Figure 4:
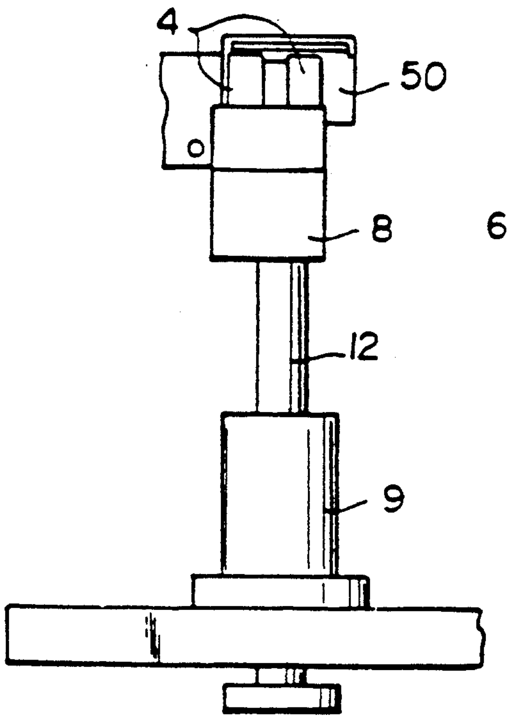
FIG. 4 is a front view showing the shaping device in the bending operation.
Figure 5:
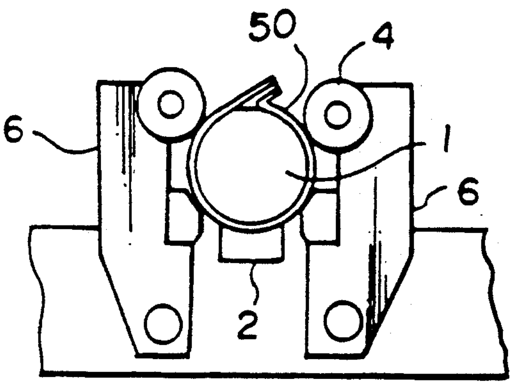
FIG. 5 is a fragmentary side view of the shaping device in the bending operation.

Thereafter, the shaping device is moved from the position shown in FIG. 2 to the position shown in FIG. 4, whereby the shell plate 50 is shaped into a hollow cylinder having a substantially perfect circular cross section as shown in FIG. 5 by the pair of bending rollers 4 rolling on the mandrel 1 with the shell plate 50 sandwiched therebetween.

Figure 6:
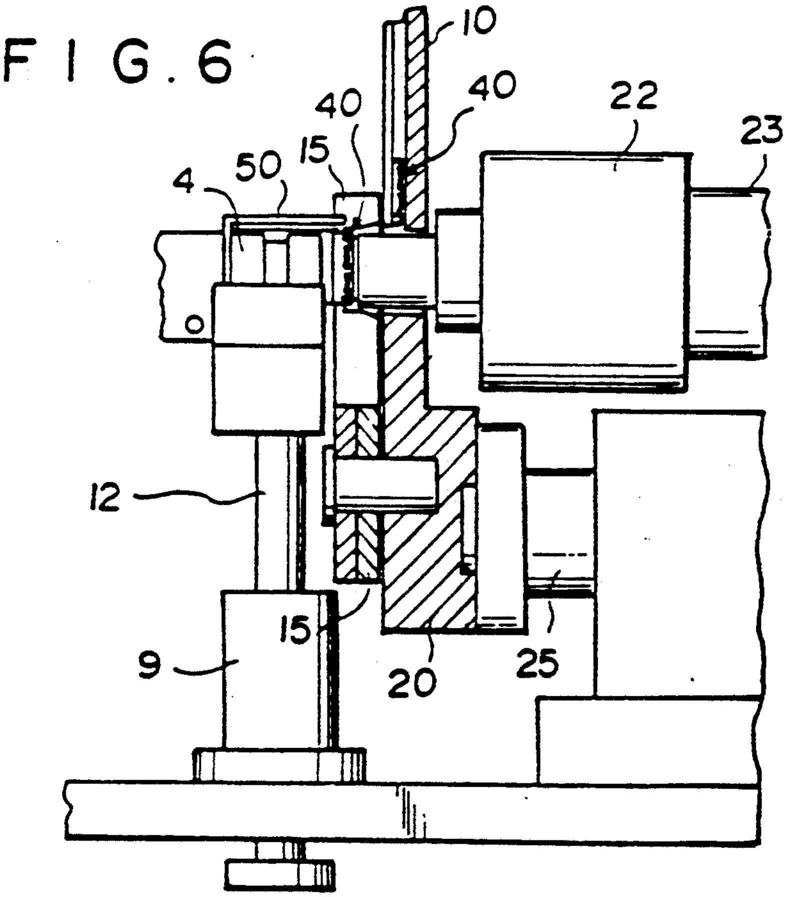
FIG. 6 is a fragmentary front view of the apparatus in the capping and clinching operation.

Then, the chuck 14 is opened, that is, the chuck halves 15 are swung away from each other, and is moved toward the mandrel 1 together with the chuck holder 20 to a capping position. In response to the movement of the chuck 14, the clinching head 22 is moved toward the mandrel 1. When the chuck 14 reaches the capping position and the end portion of the shell plate 50 is inserted between the pair of chuck halves 15, the chuck 14 is closed. The chuck halves 15 are respectively provided with semicircular recesses which define a circular opening when the chuck 14 is closed as can be understood from FIG. 3. After the chuck 14 is closed, the clinching head 22 is moved toward the shell plate 50 to bring the cap 40 into engagement with the end portion of the shell plate 50. This condition is shown in FIG. 6. Then the shaft 24 is driven to expand the expansion claws 22*a* to radially outwardly press the annular wall 40*c* of the cap 40 against the end portion of the cylindrical shell plate 50. This is accomplished with the shell plate 50 and the cap 40 grasped by the chuck 14, whereby the cap 40 is clinched to the shell plate 50.

Thereafter, the expansion claws 22 are closed and the clinching head 22 is returned to the position shown in FIG. 1. Further, the chuck 14 is opened and the chuck holder 20 is returned to the position shown in FIG. 1. Then the shaping device is moved downward to the position shown in FIG. 2, and the mandrel assembly is moved to the next station carrying thereon the capped hollow cartridge.

Though, in the above embodiment, a pair of bending rollers and a single auxiliary fitment are used, a plurality of pairs of bending rollers and a plurality of auxiliary fitments may be used. The shaping device or the capping-and-clinching device may be separately used.

What is claimed is:

1. A film cartridge-producing apparatus for shaping a shell plate into a hollow cylindrical shell and for mounting a cap on an end of the shell all at a single station, comprising, at a single station:

- a mandrel having a substantially perfectly circular cross section with a flat top portion;
- a shaping device which has a means for bending said shell plate around said mandrel so as to form said shell plate into a substantially cylindrical hollow shell having an opening and which is movable toward the mandrel to bend the shell plate around the mandrel;
- a capping-and-clinching device which is movable toward the mandrel to mount the cap on the hollow cylindrical shell on the mandrel and to clinch the cap to the hollow cylindrical shell while grasping the hollow cylindrical shell from outside the hollow cylindrical shell, wherein said capping-and-clinching device includes:
- chuck halves for grasping the hollow cylindrical shell;
- a cap-guiding means for positioning the cap with respect to both radial and axial directions of the mandrel;
- a cap-conveying means by which the cap is supplied to said cap-guiding means at the side opposite to the mandrel;
- and a clinching means which, after the cap reaches the end of the cap-conveying means, inserts the cap into the hollow cylindrical shell via the cap-guiding means and, after the cap stops at a predetermined position, deforms the cap from inside of the hollow cylindrical shell into contact with an inner surface of said hollow cylindrical shell, thus enabling said chuck-halves to hold the cap, by grasping the hollow cylindrical shell into which the cap is located, from outside the hollow cylindrical shell and prevent the cap from deforming during clinching;

first relative motion maintaining means for maintaining the relative motion between said mandrel and said shaping device during the cylindrical shaping of said shell plate around said mandrel in such a way that said shaping device moves toward said mandrel while said mandrel remains stationary as compared to the moving shaping device; and second relative motion maintaining means for maintaining the relative motion between said mandrel and said capping-and-clinching device during the mounting of said cap in such a way that said capping-and-clinching device moves towards said mandrel while said mandrel remains stationary as compared to the moving capping-and-clinching device.

* * * * *